US009918232B2

(12) United States Patent
Khawer et al.

(10) Patent No.: US 9,918,232 B2
(45) Date of Patent: Mar. 13, 2018

(54) INTERFACE FOR CONFIGURING COMMUNICATION IN UNLICENSED FREQUENCY BANDS

(71) Applicant: Alcatel-Lucent USA, Inc., Murray Hill, NJ (US)

(72) Inventors: Mohammad R. Khawer, Lake Hopatcong, NJ (US); Ruth S. Gayde, Naperville, NJ (US); Padma Sudarsan, Naperville, NJ (US); Benjamin Cheung, Berkeley Heights, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 11 days.

(21) Appl. No.: 15/139,011

(22) Filed: Apr. 26, 2016

(65) Prior Publication Data

US 2017/0311168 A1    Oct. 26, 2017

(51) Int. Cl.
  *H04W 16/14*    (2009.01)
(52) U.S. Cl.
  CPC .................... *H04W 16/14* (2013.01)
(58) Field of Classification Search
  CPC ....... H04L 63/145; H04L 63/20; H04L 67/10; H04L 67/1097; H04L 69/12; H04L 69/16; H04L 69/161; H04L 69/32; G06F 17/30864; G06F 17/30985; G06F 9/30029; G06F 9/30036; H04W 24/08; H04W 24/10; H04W 40/10; H04W 52/0209; H04W 88/08
  See application file for complete search history.

(56) References Cited

U.S. PATENT DOCUMENTS

2008/0073405 A1* 3/2008 Shima ...................... B25C 1/06
                                                            227/131
2013/0201316 A1* 8/2013 Binder .................... H04L 67/12
                                                            348/77

(Continued)

FOREIGN PATENT DOCUMENTS

WO    WO2013071488    5/2013
WO    WO2013086659    6/2013

OTHER PUBLICATIONS

Khawer, Mohammad R., et al, "usICIC—A Proactive Small Cell Interference Mitigation Strategy for Improving Spectral Efficiency of LTE Networks in the Unlicensed Spectrum", IEEE Transactions on Wireless Communications, vol. 15, No. 3, Nov. 20, 2015, pp. 2303-2311.

(Continued)

*Primary Examiner* — Diane Mizrahi
(74) *Attorney, Agent, or Firm* — Davidson Sheehan LLP (57) ABSTRACT

A node in a wireless communication system includes a transceiver to receive one or more configuration parameters to configure the node for communication in an unlicensed frequency band. The node also includes a processor to implement a state machine that transitions, based on the one or more configuration parameters, between an enable state in which the node supports wireless connectivity in the unlicensed frequency band, a disable state in which the node does not support wireless connectivity in the unlicensed frequency band, and a flywheel state in which the node supports wireless connectivity in the unlicensed frequency band for a predetermined time interval before transitioning to the disable state.

20 Claims, 5 Drawing Sheets

(56) References Cited

U.S. PATENT DOCUMENTS

2014/0302865 A1   10/2014  Bai
2015/0098437 A1    4/2015  Chen
2016/0073366 A1    3/2016  Ng
2016/0171102 A1*  6/2016  Pandya ............. G06F 17/30985
                                                                     707/712

OTHER PUBLICATIONS

International Search Report and Written Opinion correlating to PCT/US2017/026035, dated Jul. 27, 2017, 14 pages.

* cited by examiner

INTERFACE FOR CONFIGURING COMMUNICATION IN UNLICENSED FREQUENCY BANDS

BACKGROUND

Field of the Disclosure

The present disclosure relates generally to wireless communication systems and, more particularly, to wireless communication systems utilizing unlicensed frequency bands.

Description of the Related Art

Unlicensed frequency bands are portions of the radiofrequency spectrum that do not require a license for use and may therefore be used by any device to transmit or receive radiofrequency signals. For example, the Unlicensed National Information Infrastructure (UNII) is formed of portions of the radio spectrum that include frequency bands in the range of 5.15 GHz to 5.825 GHz. For another example, the industrial, scientific, and medical (ISM) radio bands are portions of the radio spectrum that are reserved internationally for unlicensed communication. The ISM radio bands include bands with a center frequency of 2.4 GHz and a bandwidth of 100 MHz, a center frequency of 5.8 GHz and a bandwidth of 150 MHz, and a center frequency of 24.125 GHz and a bandwidth of 250 MHz, among other frequency bands. Unlicensed frequency bands can be contrasted to licensed frequency bands that are licensed to a particular service provider and may only be used for wireless communication that is authorized by the service provider.

Wireless communication devices that transmit or receive signals in licensed or unlicensed frequency bands are typically referred to as nodes, which may include Wi-Fi access points that operate according to IEEE 802.11 standards in the unlicensed spectrum or base stations that operate in licensed spectrum according to standards such as Long Term Evolution (LTE) standards defined by the Third Generation Partnership Project (3GPP). For example, Wi-Fi access points may operate according to IEEE Std 802.11ac™-2013 or IEEE Std 802.11n™-2009, which are incorporated herein by reference in their entirety. Base stations that operate according to LTE can implement supplementary downlink (SDL) channels in the unlicensed spectrum to provide additional bandwidth for downlink communications to user equipment that are also communicating with the base station using channels in a licensed frequency band. For example, the base station may operate according to the LTE-U SDL Coexistence Specifications v1.3 (2015), which is incorporated herein by reference in its entirety. The licensed frequency bands may be referred to as LTE-L bands and the unlicensed frequency bands may be referred to as LTE-U bands. In some cases, base stations may also support uplink communication in the unlicensed spectrum. Wi-Fi access points and LTE base stations may be co-located or implemented in a single physical entity.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

The density of nodes deployed in some geographic areas is high enough to cause significant overlap between coverage areas (or cells) supported by the nodes in unlicensed frequency bands. Interference between transmissions by the nodes and user equipment in the corresponding cells can reduce the channel qualities in the unlicensed frequency bands. The level of interference can vary dynamically based on the distribution of the nodes and the user equipment. However, operations, administration, and management (OA&M) systems implemented in a conventional wireless communication system are not able to choose the nodes that are permitted to transmit in the unlicensed frequency bands, thereby reducing the ability of OA&M systems to control interference. Furthermore, enabling transmissions in the unlicensed frequency bands may unnecessarily consume energy in some scenarios. Some OA&M systems are configured to reduce contention between nodes that are attempting to identify a clear channel for transmission by allowing sets of nodes (such as the nodes owned by a single operator) to concurrently perform clear channel assessment, e.g., using a common set of CCA parameters. This approach may improve system performance by increasing frequency reuse in the unlicensed frequency bands under conditions of high channel congestion or low throughput, but it may also lead to a degradation in performance when congestion is low and throughput is adequate.

An interface is provided between an OA&M system and nodes that are capable of providing wireless connectivity in unlicensed frequency bands. The OA&M system can provide configuration parameters to the nodes over the interface. In some embodiments, the OA&M system provides a configuration parameter to selectively enable or disable communication by a node in the unlicensed frequency bands. A state machine in the node may transition between an enable state in which the node supports wireless connectivity in the unlicensed frequency bands, a disable state in which the node does not support wireless connectivity in the unlicensed frequency bands, and a "flywheel" state in which the node supports wireless connectivity in the unlicensed frequency bands for a predetermined time interval before transitioning to the disable state. For example, the state machine transitions from the enable state to the disable state in response to receiving a configuration parameter over the interface disabling communication in the unlicensed frequency bands. For another example, the state machine transitions from the disable state to the enable state in response to receiving a configuration parameter over the interface enabling communication in the unlicensed frequency bands. The state machine may also transition between the enable, disable, and flywheel states in response to loss or restoration of synchronization with a timing reference, enabling or disabling supplemental downlink communication, and the like.

In some embodiments, the OA&M system can provide configuration parameters over the interface to selectively enable or disable concurrent clear channel assessment by multiple nodes in the unlicensed frequency bands. Concurrent clear channel assessment is selectively enabled or disabled based, at least in part, on feedback from the nodes. For example, each node can maintain performance measurement counters that indicate metrics such as channel congestion, channel loading, and channel resource utilization in the unlicensed frequency bands. Values of the performance measurement counters or associated performance metrics) can be provided to the OA&M system over the interface and the OA&M system can determine whether to enable or disable the concurrent clear channel assessment based on the values of the performance measurement counters or performance metrics. Once the concurrent clear channel assessment feature is enabled, an OA&M module in the node can selectively turn the feature on or off based on the metrics indicated by values of the performance measurement counters (or performance metrics) in the node. For example, the node may perform concurrent clear channel assessment (e.g., using a common set of CCA parameters) if the performance metrics indicate low throughput or high channel congestion. However, if the performance metrics indicate that channel congestion is low and throughput is adequate, the node may perform independent clear channel assessment (e.g., using node-specific CCA parameters). Synchronization to a global or external timing reference may also be required to perform concurrent clear channel assessment.

Figure 1:
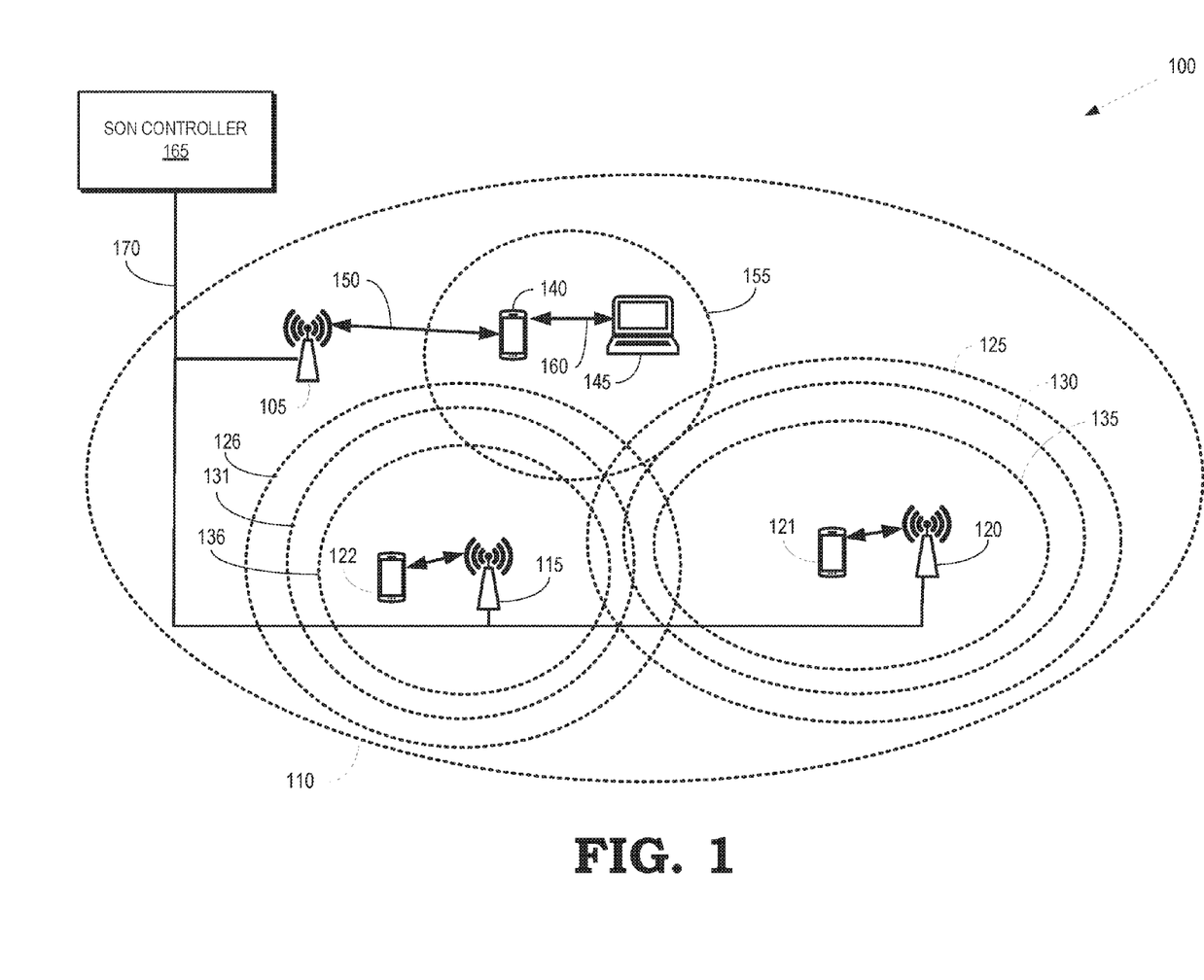
FIG. 1 is a diagram of a wireless communication system according to some embodiments.

FIG. 1 is a diagram of a wireless communication system 100 according to some embodiments. The wireless communication system 100 includes one or more eNodeBs 105 that provide wireless connectivity according to a first radio access technology (RAT), e.g., according to the LTE standards defined by the Third Generation Partnership Project (3GPP). The eNodeB 105 provides wireless connectivity within a first geographical area or cell 110. The wireless communication system 100 also includes small cells 115, 120 that provide wireless connectivity according to the first RAT and a second RAT such as Wi-Fi, as defined by the IEEE 802 standards. The small cells 115, 120 may provide wireless connectivity according to the first and second RATs using collocated transceivers or transceivers that are connected by an interface. As used herein, the term "node" may be used to indicate an entity that provides wireless connectivity according to the first or second RATs. Thus, the term "node" may refer to an eNodeB that is part of a macrocellular network, as well as an access point or small cell that overlies the macrocellular network. Small cells may also be referred to as home base station routers, metrocells, microcells, picocells, femtocells, and the like.

Some embodiments of the eNodeB 105 or the small cells 115, 120 may operate according to fifth-generation (or 5G) standards for wireless communication. The 5G standards may specify data rates of tens of megabits per second that can be supported for tens of thousands of concurrent users, several hundreds of thousands of simultaneous connections, improved spectral efficiency relative to LTE, reduce latency relative to LTE, and the like.

The small cells 115, 120 may provide uplink or downlink communications to user equipment 121, 122 over one or more carriers in a licensed frequency band within the cells 125, 126. Examples of user equipment 121, 122 include wireless communication devices that operate according to LTE, machine-to-machine (M2M) devices, smart phones, mobile terminals, wireless-enabled tablets, wireless network interface cards, Wi-Fi sticks, radio transceivers integrated with sensors, 5G transceivers, 5G radio terminals, and the like. The licensed carriers operate according to the first RAT and may be referred to as LTE licensed (LTE-L) carriers. The small cells 115, 120 may also support wireless connectivity over carriers in one or more unlicensed frequency bands according to the first RAT within cells 130, 131. The unlicensed carriers that operate according to the first RAT may be referred to as LTE unlicensed (LTE-U) carriers. The unlicensed frequency bands may include the Unlicensed National Information Infrastructure (UNIT), which is formed of portions of the radio spectrum that include frequency bands in the range of 5.15 GHz to 5.825 GHz such as the U-NII-1 band in the range 5.15-5.25 GHz, the U-NII 2a, b, c bands in the range 5.25-5.725 GHz, and the U-NII 3 band in the range 5.725-5.825 GHz. In some embodiments, the transmission power used by the small cells 115, 120 to transmit signals in the licensed frequency band is larger than the transmission power used by the small cells 115, 120 to transmit signals in the unlicensed frequency band according to the first RAT. Consequently, the cells 125, 126 are larger than the corresponding cells 130, 131 in FIG. 1.

The small cells 115, 120 may operate one or more of the unlicensed carriers in different operating modes. For example, the small cells 115, 120 may implement a supplemental downlink carrier in the unlicensed frequency band according to the first RAT. The supplemental downlink carrier is used to carry best effort downlink data from the small cells 115, 120 to the user equipment 121, 122. A primary carrier is anchored in the licensed frequency band and is used to carry control data for the supplemental downlink carrier, as well as uplink data from the user equipment 121, 122 to the corresponding small cells 115, 120. For another example, the small cells 115, 120 may implement a carrier aggregation mode in which a secondary carrier in the unlicensed frequency band carries both uplink and downlink best effort data. A primary carrier is anchored in the licensed frequency band and is used to carry control data for the secondary carrier.

The small cells 115, 120 also support wireless connectivity over carriers that operate in the unlicensed frequency bands according to the second RAT within cells 135, 136. For example, the small cells 115, 120 may support wireless connectivity over carriers that operate according to conventional Wi-Fi or carrier-grade Wi-Fi, which supports additional functionality such as user authentication, mobility management, and the like. In some embodiments, the transmission power used by the small cells 115, 120 to transmit signals in the licensed frequency band is larger than the transmission power used by the small cells 115, 120 to transmit signals in the unlicensed frequency band according to the first RAT, which is larger than the transmission power used by the small cells 115, 120 transmit signals in the unlicensed frequency bands according to the second RAT. Since the uplink transmit power in the unlicensed spectrum is less than the uplink transmit power of the licensed spectrum (around 3 dB difference in some scenarios), the coverage areas of the cells 135, 136 are smaller than the coverage areas of the cells 130, 131, in which uplink traffic including control and signaling traffic is carried over the licensed spectrum.

Some embodiments of user equipment 140 may be used to provide wireless connectivity in the unlicensed frequency bands to other wireless-enabled devices such as a laptop 145. Providing wireless connectivity to the laptop 145 via the user equipment 140 may be referred to as tethering the laptop 145 to the user equipment 140. The user equipment 140 can establish a wireless connection 150 with the eNodeB 105 in the licensed frequency bands according to the first RAT. The user equipment 140 also provides wireless connectivity according to the second RAT within a corresponding cell 155 and the laptop 145 can establish a wireless connection 160 with the user equipment 140 using channels of the unlicensed frequency bands according to the second RAT. The user equipment 140 may convey uplink information from the laptop 145 to the eNodeB 105 over the wireless connection 150 and downlink information from the eNodeB 105 to the laptop 145 over the wireless connection 160.

The wireless communication system 100 includes a self-organizing network (SON) controller 165 that is configured to perform planning, configuration, management, optimization, and healing of the wireless communication system 100. For example, the SON controller 165 may implement an OA&M system for the wireless communication system 100. The eNodeB 105 and the small cells 115, 120 are connected to the SON controller 165 by an interface 170, which may be implemented using wired connections, wireless connections, or any combination thereof. The user equipment 140 is connected to the SON controller 165 by an interface formed of portions of the interface 170, the eNodeB 105, and the wireless connection 150. The SON controller 165 may perform OA&M operations on the basis of information reported over the interface 170. For example, the eNodeB 105 is configured to monitor characteristics of communication in the licensed frequency bands according to the first RAT. The information acquired during the monitoring may be used to increment performance measurement (PM) counters associated with the licensed frequency bands. The eNodeB 105 increments the PM counters over a time interval such as a fifteen minute time interval and then provides the values of the PM counters to the SON controller 165, which may use the PM counter values to perform planning, configuration, management, optimization, or healing operations.

In the illustrated embodiment, the relatively high density of small cells 115, 120 and user equipment 140 that are configured to provide wireless connectivity leads to overlap of the cells 125, 126, 130, 131, 135, 136, and 155. Overlap of the cells 130, 131, 135, 136, and 155 may lead to interference between transmissions by the small cells 115, 120 and user equipment 140 that may reduce the channel qualities in the unlicensed frequency bands. The level of interference can vary dynamically based on the distribution of the small cells 115, 120 and user equipment 140. Nodes such as the small cells 115, 120 and the user equipment 140 may therefore be configured to selectively enable or disable communication in the unlicensed frequency bands.

Some embodiments of the SON controller 165 are configured to transmit one or more configuration parameters over the interface 170 to the small cells 115, 120 or the user equipment 140, which may receive the configuration parameters and use them to configure communication using one or more unlicensed frequency bands in corresponding cells 130, 131, 135, 136, and 155. Some embodiments of the small cells 115, 120 or the user equipment 140 implement state machines (not shown in FIG. 1) that indicate an operating state of the corresponding small cell 115, 120 or user equipment 140. The state machine may transition between operating states based on the received configuration parameters. For example, the state machine in a node (such as a small cell 115, 120 or user equipment 140) may transition the operating state of the node between an enable state in which the node supports wireless connectivity in the unlicensed frequency bands, a disable state in which the node does not support wireless connectivity in the unlicensed frequency bands, and a flywheel state in which the node supports wireless connectivity in the unlicensed frequency bands for a predetermined time interval before transitioning to the disable state.

Nodes that transmit in the unlicensed frequency band use clear channel assessment (CCA) to detect the presence of other nodes transmitting on the channels of the unlicensed frequency bands and acquire the channel for transmission. For example, CCA may compare the strength of signals received on a channel of the unlicensed frequency bands (RSSI) to an energy detection (ED) threshold to determine if the channel is being used by other nodes for transmission or not. If the detected channel RSSI is below the ED threshold, the CCA is deemed successful, and the channel is acquired for a period of time (a channel occupancy period) for transmission before it is released. The channel occupancy period may be limited to a maximum duration after a successful CCA operation. For example, LBT regulations set a maximum channel occupancy period of 10 milliseconds (msec) for Europe and 4 msec for Japan.

Overlap of the cells 130, 131, 135, 136, and 155 may lead to contention between small cells 115, 120 and user equipment 140 during CCA. This contention may be reduced by allowing sets of nodes (such as the nodes owned by a single operator) to concurrently perform clear channel assessment and, if the concurrent CCA is successful, the nodes may also transmit concurrently during the acquired channel occupancy period. Some embodiments of the SON controller 165 may therefore provide a common set of CCA parameters to the small cells 115, 120 and the user equipment 140 over the interface 170 so that the small cells 115, 120 and the user equipment 140 perform concurrent clear channel assessment based on the common set of CCA parameters. In some cases, the SON controller 165 may selectively provide node-specific CCA parameters over the interface 170 so that the small cells 115, 120 and the user equipment 140 perform clear channel assessment in different time intervals indicated by the different sets of node-specific CCA parameters. Selectively configuring the nodes for concurrent CCA may improve system performance by increasing frequency reuse in the unlicensed frequency bands under conditions of high channel congestion or low throughput because nodes may concurrently transmit rather than backing off due to a CCA operation that fails because of conflict with the other nodes, which may reduce the latency that is incurred to acquire the channel when too many overlapping nodes are sharing the unlicensed channel. Selectively configuring the nodes for node-specific CCA may avoid degradation in performance when congestion is low and throughput is adequate.

Figure 2:
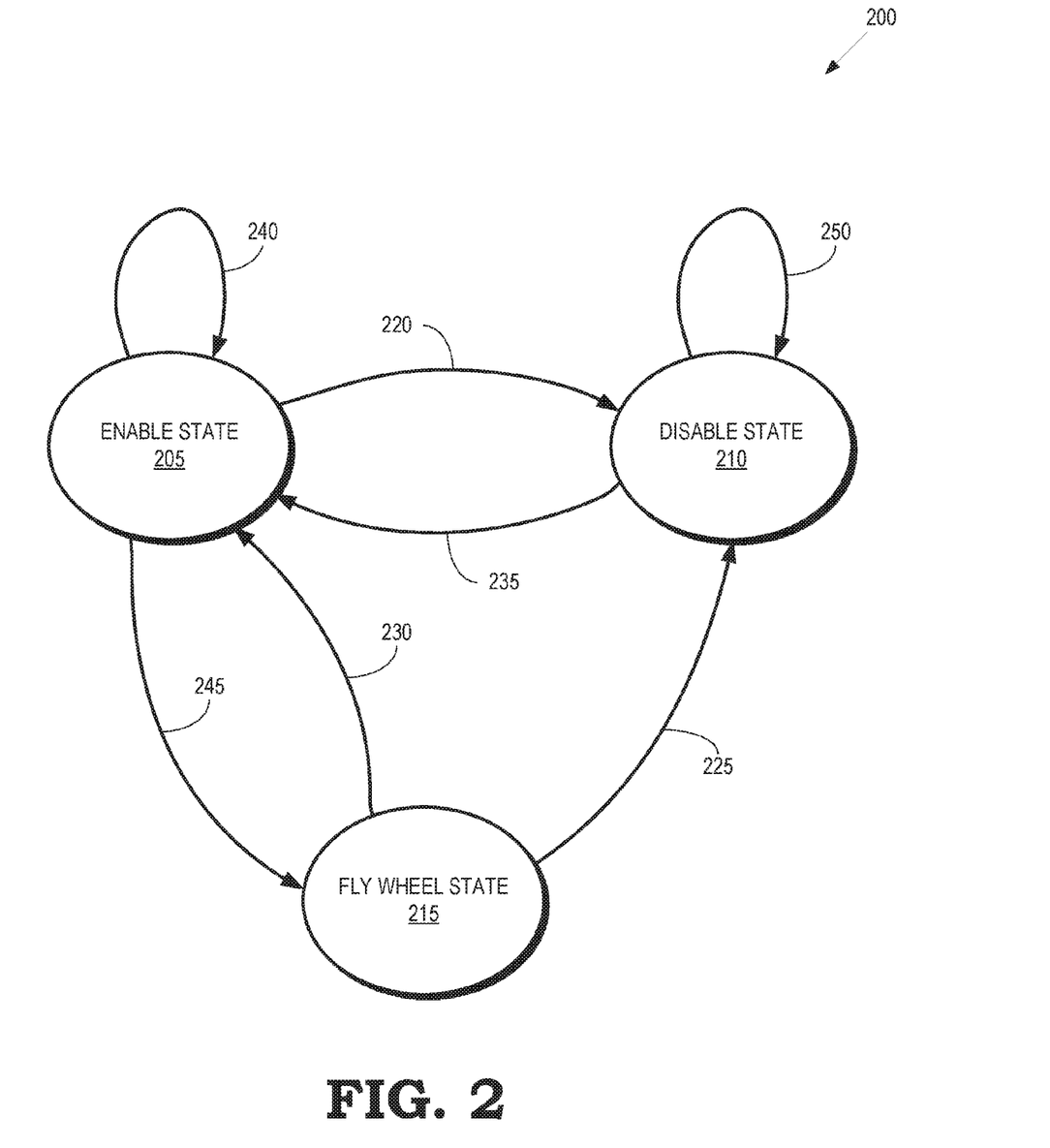
FIG. 2 is a diagram of a state machine that is used to indicate an operational state of a node for communication in one or more unlicensed frequency bands according to some embodiments.

FIG. 2 is a diagram of a state machine 200 that is used to indicate an operational state of a node for communication in one or more unlicensed frequency bands according to some embodiments. The state machine 200 may be implemented using hardcoded logic (e.g., an application specific integrated circuit (ASIC)), using programmable logic (e.g., a programmable logic device (PLD)), using one or more processors executing software or other executable code, or using a combination of one or more of hardcoded logic, programmable, logic, and one or more processors executing code. The state machine 200 may be implemented, for example, in the small cells 115, 120 or in the user equipment 140 shown in FIG. 1. The state machine 200 includes an enable state 205 in which the node supports wireless connectivity in the unlicensed frequency bands, a disable state 210 in which the node does not support wireless connectivity in the unlicensed frequency bands, and a flywheel state 215 in which the node supports wireless connectivity in the unlicensed frequency bands for a predetermined time interval before transitioning to the disable state 210. Some embodiments of the node implement a timer (not shown in FIG. 2) that begins running in response to transitioning into the flywheel state 215 and expires after the predetermined time interval.

Transitions between the operating states indicated by the state machine 200 may occur in response to control messages transmitted over an interface between an OA&M system and the node, such as the interface 170 shown in FIG. 1. Some embodiments of the control messages include one or more configuration parameters such as a configuration parameter that enables or disables operation in one or more unlicensed frequency bands. For example, an unlicensed spectrum control configuration parameter may be included in the control message. The unlicensed spectrum control configuration parameter may be given a value of ON to enable operation in the unlicensed frequency bands and a value of OFF to disable operation in the unlicensed frequency bands. The state machine 200 transitions to the disable state 210 in response to receiving an unlicensed spectrum control configuration parameter that has a value of OFF, as indicated by the transitions 220, 225. The state machine 200 remains in the disable state 210 until an unlicensed spectrum control configuration parameter having a value of ON is received, or if the internal clock synchronization with an external timing reference such as a GPS timing reference is restored that allows the state machine to revert back to the enable state 205. The state machine 200 may be in either the enable state 205 or the flywheel states 215 as long as the most recently received unlicensed spectrum control configuration parameter has a value of ON.

Operations in the unlicensed frequency bands may be enabled by transmitting an unlicensed spectrum control configuration parameter having a value of ON. In response to receiving the parameter having a value of ON, the state machine 200 evaluates whether the node is synchronized with an external timing reference such as a GPS timing reference or a Precision Timing Protocol (PTP) reference, e.g., as defined by the IEEE 1588™-2002 standard or the IEEE™-2008 standard, which may also be referred to as PTP Version 2. If both conditions are met (configuration parameter=ON, synchronization acquired), the state machine 200 transitions to the enable state 205, as indicated by the transitions 230, 235. The state machine 200 remains in the enable state 205 as long as these conditions continue to be met, as indicated by the transition 240.

Some embodiments of the node may initiate transitions on the basis of events that take place at the node. For example, the node may be performing opportunistic supplemental downlink (SDL) transmissions by transmitting best effort data traffic on one or more channels in the unlicensed frequency bands in combination with control and data traffic that is transmitted in the licensed frequency bands. The node may turn off opportunistic SDL in response to determining that the bandwidth needed to transmit data can be provided using only channels in the licensed frequency bands. The node may therefore disable communication in the unlicensed frequency bands, e.g., to reduce interference or save battery life at the node by eliminating the need to perform channel scanning in the unlicensed frequency band. The state machine 200 transitions from the enable state 205 to the disable state 210 in response to the node disabling communication in the unlicensed frequency bands, as indicated by the transition 220.

The node may transition from the enable state 205 to the flywheel state 215 in response to the node losing synchronization with the external timing reference, as indicated by the transition 245. In the flywheel state 215, a system oscillator implemented in the node is free running and therefore drifts relative to the external timing reference (and other nodes) leading to a system clock drift over a period of time. The system clock drift may cause the state machine 200 to transition from the flywheel state 215 to the disable state 210, as indicated by the transition 225. For example, the node may operate according to a radio access technology such as LTE-U, which uses Carrier Sensing Adaptive Transmission (CSAT) to support coexistence with nodes that operate according to other radio access technologies, such as Wi-Fi. Subframe puncturing may be used to provide time intervals for transmission by the nodes that operate according to the other radio access technology. For example, when an LTE-U node is sharing a channel with another LTE-U node, a network listen module on the LTE-U node provides additional information that allows the LTE-U node to determine whether the other LTE-U node belongs to the same operator or not. Typically, nodes that are operated by the same operator are synchronized along the same sub-frame boundary and therefore start their CSAT cycle at the same time. The network listen module also determines a volume of Wi-Fi latency sensitive traffic on the channel in the unlicensed frequency band. If that volume is higher than a threshold that represents a channel congestion condition, the LTE-U node should perform adaptive sub-frame puncturing of the CSAT LTE-U ON period to allow the Wi-Fi latency sensitive applications (such as voice over Wi-Fi) an opportunity to transmit sooner than the entire duration of the LTE-U ON period. If the node is the only LTE-U node using the channel, then the node may use adaptive sub-frame puncturing mechanism in the flywheel state 215. However, nodes in the flywheel state 215 that share a channel in the unlicensed frequency band with another node that is operated by the same operator may not be able to use adaptive sub-frame puncturing during the LTE-U ON periods of the CSAT cycle because of the system clock drift. The state machine 200 may therefore transition from the flywheel state 215 to the disable state 210 (as indicated by the transition 225) since the node cannot coexist with Wi-Fi in a fair manner.

Some embodiments of the node may also set a maximum allowed time interval in response to entering the flywheel state 215. The node may remain synchronized with other nodes in the wireless communication system up to the maximum allowed time interval, after which synchronization with the other nodes along subframe boundaries may not be guaranteed. The state machine 200 may therefore transition from the flywheel state 215 to the disable state 210 (as indicated by the transition 225) in response to a timer indicating that the maximum allowed time interval has elapsed since the loss of synchronization with the external timing reference. If synchronization with the external timing reference is restored prior to expiration of the timer, the state machine 200 transitions from the flywheel state 215 to the enable state 205, as indicated by the transition 245.

The state machine 200 may transition from the disable state 210 to the enable state 215 (as indicated by the transition 235) in response to receiving an unlicensed spectrum control configuration parameter having a value of ON or in response to acquiring synchronization with the external timing reference. Either of these events cause the state machine 200 to determine whether both criteria are satisfied and, if so, the state machine 200 transitions from the disable state 210 to the enable state 215 as indicated by the transition 235. If one of the criteria is not satisfied, the state machine 200 remains in the disable state 210, as indicated by the transition 250.

Conditions for transitions between the enable state 205, the disable state 210, and the flywheel state 215 are summarized in the following table.

State Transition Summary Table

| INITIAL STATE | TRANSITION STATE | TRANSITION TRIGGER | DESCRIPTION |
|---|---|---|---|
| ENABLE STATE | DISABLE STATE | Configuration Parameter = OFF | LTE-U operation turned off by the operator |
| ENABLE STATE | DISABLE STATE | Opportunistic SDL turned OFF - AND Configuration Parameter = ON | LTE-U operation becomes disabled by the LTE-U Scheduler |
| ENABLE STATE | FLY-WHEEL STATE | Loss of synchronization, Small cell running in fly-wheel mode - AND Configuration Parameter = ON | Synchronization has been lost, and the system goes into fly-wheel mode |
| ENABLE STATE | ENABLE STATE | System operational - AND Configuration Parameter = ON | Normal system operation |
| DISABLE STATE | ENABLE STATE | Configuration parameter = ON - AND System clock sync restored | LTE-U operation becomes enabled |
| DISABLE STATE | ENABLE STATE | Configuration parameter = ON - AND Opportunistic SDL turned ON by LTE Scheduler | LTE-U operation becomes enabled |
| DISABLE STATE | FLY-WHEEL STATE | This case is a theoretical transition, which may be blocked from occurring. - AND Configuration Parameter = ON | Theoretical Corner case where a debilitating system error condition is cleared within the max flywheel time, however, synchronization has not returned |
| DISABLE STATE | DISABLE STATE | Disabled condition persists- | Error conditions persist, or other system problems persist |
| FLY-WHEEL STATE | ENABLE STATE | Synchronization restored - AND Configuration Parameter = ON | System timing and synchronization have been restored, system returns to normal operation |
| FLY-WHEEL STATE | DISABLE STATE | Maximum fly-wheel time exceeded - AND Configuration Parameter = ON | Maximum fly-wheel time causes system to become disabled. |
| FLY-WHEEL STATE | DISABLE STATE | Configuration Parameter = OFF | LTE operations in unlicensed spectrum turned off by the operator |
| FLY-WHEEL STATE | DISABLE STATE | Advanced subframe puncturing of the CSAT LTE-U ON period cannot be performed that is needed for co-existence with Wi-Fi delay sensitive applications (such as Voice over Wi-Fi) - AND Configuration Parameter = ON | The loss of sync at the Small Cell will cause the Small Cell clock to drift and the Small Cell may no longer be time aligned on the same subframe boundaries with other Small Cells in the network. |

The following table identifies clock synchronization fallback transitions. In the illustrated embodiment, the node provides wireless connectivity in the licensed frequency band over a primary carrier (Pcell) and in the unlicensed frequency bands over a secondary carrier (Scell). The external timing reference may be provided by a GPS signal that provides frequency information, phase information, and time-of-day information to either the Pcell or the Scell. The external timing reference may also be provided by an IEEE 1588 PTP timing reference that provides frequency information, phase information, and time-of-day information to the Pcell or the Scell.

| PRIMARY/SECONDARY CLOCK SOURCE | REMAINING SYNC SOURCE | RESULT |
|---|---|---|
| GPS (Freq, Phase, ToD) Primary<br>IEEE1588 PTP (Freq, Phase, ToD) Secondary | GPS (Freq, Phase, ToD) Active<br>IEEE1588 PTP Lost | LTE PCell active and LTE-U SCell active. |
| GPS (Freq, Phase, ToD) Primary<br>IEEE1588 PTP (Freq, Phase, ToD) Secondary | GPS Lost<br>IEEE1588 PTP (Freq, Phase, ToD) Active | LTE PCell active and LTE-U SCell active. |
| GPS (Freq, Phase, ToD) Primary<br>IEEE1588 PTP (Freq, Phase, ToD) Secondary | GPS Phase/ToD lost, GPS Freq Sync active<br>IEEE 1588 PTP Lost | LTE PCell active and LTE-U SCell operation in Fly-Wheel state (see state transition description for fly-wheel management above) |
| GPS (Freq, Phase, ToD) Primary<br>IEEE1588 PTP (Freq, Phase, ToD) Secondary | GPS Lost<br>IEEE 1588 PTP Phase/ToD lost<br>IEEE 1588 Freq Active | LTE PCell active and LTE-U SCell operation in Fly-Wheel state (see state transition description for fly-wheel management above) |
| IEEE1588 PTP (Freq, Phase, ToD) Primary<br>GPS (Freq, Phase, ToD) Secondary | IEEE1588 PTP (Freq, Phase, ToD) Active<br>GPS Lost | LTE PCell active and LTE-U SCell active. |
| IEEE1588 PTP (Freq, Phase, ToD) Primary<br>GPS (Freq, Phase, ToD) Secondary | IEEE1588 PTP Lost<br>GPS (Freq, Phase, ToD) Active | LTE PCell active and LTE-U SCell active. |
| IEEE1588 PTP (Freq, Phase, ToD) Primary<br>GPS (Freq, Phase, ToD) Secondary | IEEE1588 PTP Phase/ToD lost<br>IEEE1588 PTP Freq Sync Active<br>GPS Lost | LTE PCell active and LTE-U SCell operation in Fly-Wheel state (see state transition description for fly-wheel management above) |
| IEEE1588 PTP (Freq, Phase, ToD) Primary<br>GPS (Freq, Phase, ToD) Secondary | IEEE1588 PTP Lost<br>GPS Freq Sync Active<br>GPS Phase/ToD Lost | LTE PCell active and LTE-U SCell operation in Fly-Wheel state (see state transition description for fly-wheel management above) |

The following table identifies clock synchronization fall-forward transitions. In the illustrated embodiment, the node provides wireless connectivity in the licensed frequency band over a primary carrier (Pcell) and in the unlicensed frequency bands over a secondary carrier (Scell). The external timing reference may be provided by a GPS signal that provides frequency information, phase information, and time-of-day information to either the Pcell or the Scell. The external timing reference may also be provided by an IEEE1588 PTP timing reference that provides frequency information, phase information, and time-of-day information to the Pcell or the Scell.

| INITIAL STATE | FINAL STATE | RESULT |
|---|---|---|
| GPS Primary/1588PTP Secondary<br>GPS (Freq, Phase, ToD) Active<br>IEEE1588 PTP Lost | GPS (Freq, Phase, ToD) Active<br>IEEE1588 PTP Active | LTE PCell active and LTE-U SCell active. |
| GPS Primary/1588PTP Secondary<br>GPS (Freq, Phase, ToD) Active<br>IEEE1588 PTP Lost | GPS (Freq, Phase, ToD) Lost<br>IEEE1588 PTP Active | LTE PCell active and LTE-U SCell active. |
| GPS Primary/1588 PTP Secondary<br>GPS Lost<br>IEEE1588 PTP (Freq, Phase, ToD) Active | GPS Active<br>IEEE1588 PTP (Freq, Phase, ToD) Active | LTE PCell active and LTE-U SCell active. |
| GPS Primary/1588 PTP Secondary<br>GPS Lost<br>IEEE1588 PTP (Freq, Phase, ToD) Active | GPS (Freq, Phase/ToD) Active<br>IEEE1588 PTP Lost | LTE PCell active and LTE-U SCell active. |
| GPS Primary/1588 PTP Secondary<br>GPS Phase/ToD lost, GPS Freq Sync active<br>IEEE 1588 PTP Lost | GPS Active<br>IEEE 1588 PTP Active | LTE PCell active and LTE-U SCell active |

-continued

| INITIAL STATE | FINAL STATE | RESULT |
|---|---|---|
| GPS Primary/1588 PTP Secondary GPS Phase/ToD lost, GPS Freq Sync active IEEE 1588 PTP Lost | GPS Lost IEEE 1588 PTP Active | LTE PCell active and LTE-U SCell active |
| GPS Primary/1588PTP Secondary GPS Lost IEEE 1588 PTP Phase/ToD lost IEEE 1588 Freq Active | GPS Active IEEE 1588 Active | LTE PCell active and LTE-U SCell active |
| GPS Primary/1588PTP Secondary GPS Lost IEEE 1588 PTP Phase/ToD lost IEEE 1588 Freq Active | GPS Active 1588PTP Lost | LTE PCell active and LTE-U SCell active |
| 1588 PTP Primary/GPS Secondary IEEE1588 PTP (Freq, Phase, ToD) Active GPS Lost | GPS Active IEEE 1588 Active | LTE PCell active and LTE-U SCell active. |
| 1588 PTP Primary/GPS Secondary IEEE1588 PTP (Freq, Phase, ToD) Active GPS Lost | 1588 PTP Lost GPS Active | LTE PCell active and LTE-U SCell active. |
| 1588 PTP Primary/GPS Secondary IEEE1588 PTP Lost GPS (Freq, Phase, ToD) Active | GPS Active IEEE 1588 Active | LTE PCell active and LTE-U SCell active. |
| 1588 PTP Primary/GPS Secondary IEEE1588 PTP Lost GPS (Freq, Phase, ToD) Active | 1588 PTP Active GPS Lost | LTE PCell active and LTE-U SCell active. |
| 1588 PTP Primary/GPS Secondary IEEE1588 PTP Phase/ToD lost IEEE1588 PTP Freq Sync Active GPS Lost | GPS Active IEEE 1588 Active | LTE PCell active and LTE-U SCell active. |
| 1588 PTP Primary/GPS Secondary IEEE1588 PTP Phase/ToD lost IEEE1588 PTP Freq Sync Active GPS Lost | 1588 PTP Lost GPS Active | LTE PCell active and LTE-U SCell active. |
| 1588 PTP Primary/GPS Secondary IEEE1588 PTP Lost GPS Freq Sync Active GPS Phase/ToD Lost | GPS Active IEEE 1588 Active | LTE PCell active and LTE-U SCell active. |
| 1588 PTP Primary/GPS Secondary IEEE1588 PTP Lost GPS Freq Sync Active GPS Phase/ToD Lost | 1588 PTP Active GPS Lost | LTE PCell active and LTE-U SCell active. |

Some embodiments of the nodes implement the same channelization structure for communication in the unlicensed frequency bands according to different radio access technologies. For example, a node that operates according to LTE-U in the 5 GHZ band can be configured to utilize a channelization structure that is the same as the channelization structure used for communication in the unlicensed frequency band by nodes that operate according to the WIFI 802.11 standards. Nodes that use different radio access technologies may also use the same guard band structure to effectively share the unlicensed frequency spectrum and to be a fair neighbor to other nodes that operate according to the different radio access technologies and share the same operating channel. The following is an example of a channelization structure that is shared between LTE-U that uses the UNIT unlicensed frequency bands for license assisted access (LAA) and Wi-Fi:

UNII-1 will have four LAA 20 MHZ channels corresponding to WIFI channels 36, 40, 44, & 48.

UNII-2a will have four LAA 20 MHZ channel corresponding to WIFI channels 52, 56, 60, and 64 that have DFS requirements UNII-2c will have nine LAA 20 MHZ channels corresponding to WIFI channels 100 to 144 that have DFS requirements, and excluding the three blocked channels of 120, 124, & 128

UNII-3 will have five LAA 20 MHZ channels corresponding to WIFI channels 149, 153, 157, 161, 165.

Some embodiments of LAA operate according to 3GPP TR 36.889 V13.0.0 (2015-06)—Study on Licensed Assisted Access to Unlicensed Spectrum (Release 13).

Some embodiments of the node use listen-before-talk (LBT) techniques to share the limited number of 20 MHZ unlicensed channels, particularly in a dense deployment scenario consisting of many Wi-Fi nodes and many multi-operator LAA nodes. For example, each of the LAA nodes may need to contend for channel access with one or more Wi-Fi access points. The LAA nodes also have to contend with one or more Wi-Fi stations that are served by the Wi-Fi access points because the Wi-Fi stations may need to acquire the same channel in the unlicensed frequency band for uplink transmissions, e.g. medium access control (MAC) Wi-Fi ACK/NAK messages, transmission control protocol (TCP) ACK/NAK messages or uplink data transmissions. The LBT regulations require that each transmitting node has to first perform clear channel assessment (CCA) before the transmitting node may acquire the channel to start its transmission. The overhead time required to acquire a channel using CCA operation may increase as the number of nodes (including Wi-Fi access points and Wi-Fi stations) that are sharing the channel increases. The CCA overhead time adds to the overall performance overhead for data transmission in the wireless communication system.

Overlapping nodes that are owned by the same operator and coexist on the same channels in the unlicensed frequency band may be configured to perform CCA operations concurrently. For example, an OA&M system may provide one or more configuration parameters that enable the overlapping notes for concurrent CCA operation and provide common CCA parameters that are shared by the nodes that perform concurrent CCA operation. The CCA parameters may include parameters indicating a starting time for the CCA operation, a duration of the CCA operation, a backoff duration before attempting a new CCA operation after a failed attempt to acquire the channel, and the like. Transmitting the information used for the CCA operation concurrently from multiple nodes may reduce the Signal to Interference plus Noise Ratio (SINR) at the user equipment that receives the signals. However, the lower spectral efficiency may be offset by reduced overhead because concurrent CCA operation may reap savings in overhead time spent in CCA operation in an extremely dense and heavily congested channel deployment scenario. For example, by allowing the nodes owned by the same operator to transmit concurrently, the chances of a successful channel access for the nodes may increase because the nodes do not have to contend with each other for the channel usage. Frequency reuse of the unlicensed frequency bands may be enhanced (and in some cases may approach the theoretical maximum of 1, which indicates that the node may transmit at any time) by implementing concurrent CCA operation to reduce the channel access time for nodes that are owned or operated by the same operator.

Figure 3:
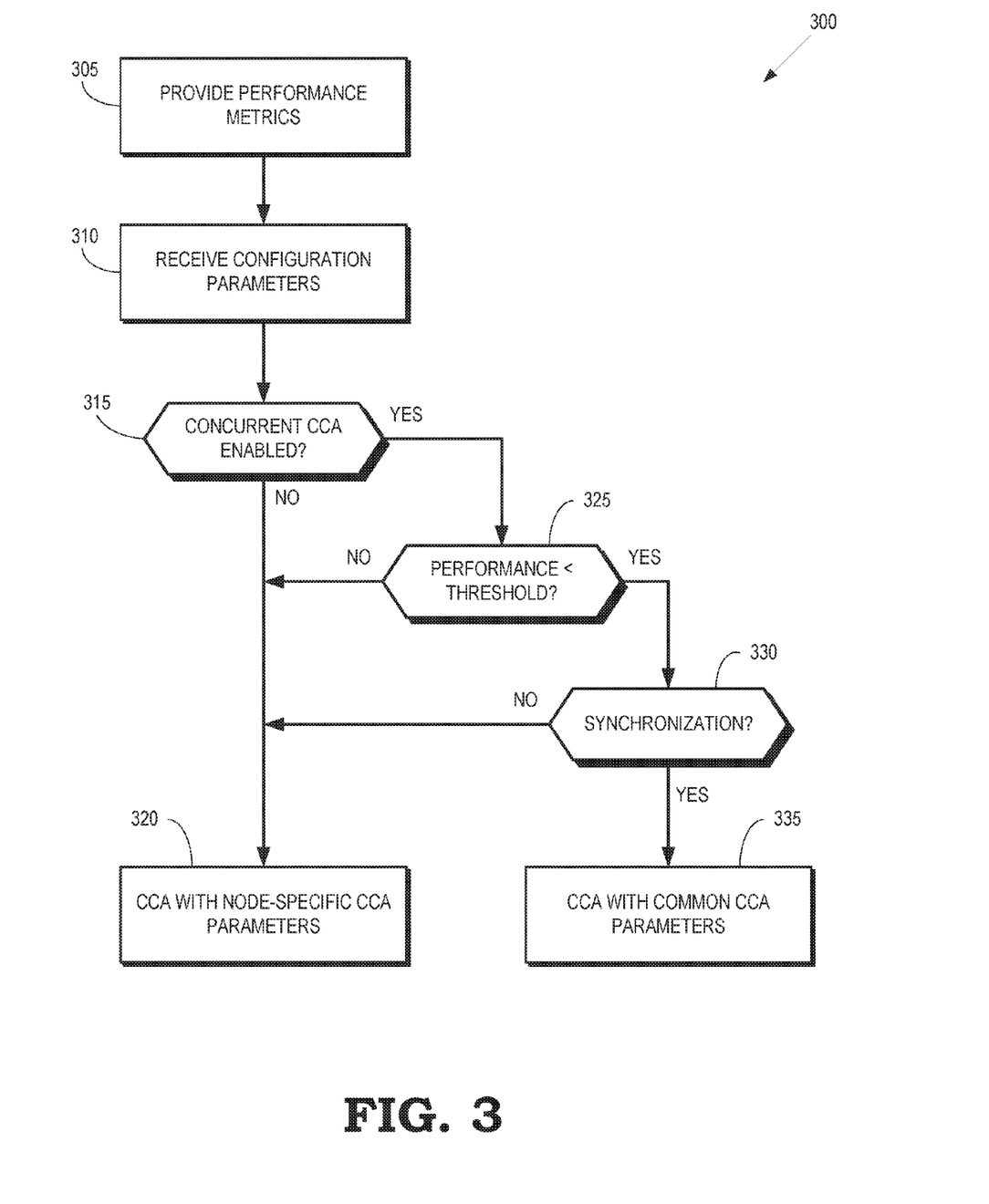
FIG. 3 is a flow diagram of a method of selectively enabling concurrent clear channel assessment (CCA) by multiple nodes according to some embodiments.

FIG. 3 is a flow diagram of a method 300 of selectively enabling concurrent clear channel assessment (CCA) by multiple nodes according to some embodiments. The method 300 may be implemented in a node that is configured for communication in unlicensed frequency bands such as some embodiments of the small cells 115, 120 or the user equipment 140 in wireless communication system 100 shown in FIG. 1.

At block 305, the node provides performance metrics that indicate values of performance measurement counters to a controller. Some embodiments of the performance measurement counters include counters that indicate congestion of one or more of the channels in the unlicensed frequency band, loading of the channels, resource utilization by the channels, and the like. Channel loading (L) is defined as the fraction of time allocated to the node for transmission of data to one or more user equipment over the channel. Channel resource utilization (U) is defined as the fraction of time that the node is transmitting to one or more user equipment over a channel in the unlicensed frequency band. Thus, channel resource utilization is always less than or equal to channel loading so that U≤L. Channel congestion (C) is defined as a function of the channel loading and resource utilization. For example, the channel congestion may be defined as C=1−U/L so that 0≤C≤1. Using this definition, lower values of C indicate that the channel is more congested and higher values of C indicate that the channel is less congested. Some embodiments may use other definitions of channel congestion, loading, or resource utilization. A scheduler in the node may use the values of the performance measurement counters to compute channel congestion, channel loading, or channel resource utilization metrics. Some embodiments of the scheduler may also compute an average throughput of the node over a time interval and provide information indicating the average throughput to the controller at block 305.

At block 310, the node receives configuration parameters generated by the controller in response to (and based on) the values of the performance metrics. The controller may also receive values of the performance metrics provided by other nodes and may use these values in conjunction with the performance metrics provided by the node at block 305 to generate configuration parameters for the multiple nodes. For example, the controller may determine whether to enable or disable concurrent CCA operation for the multiple nodes (including the node that provided the performance metrics at block 305) based on the values of the performance metrics provided by the multiple nodes. The controller may also consider other dynamic system events such as loss of clock synchronization by one or more of the nodes. The configuration parameters generated by the controller may also include a common set of clear channel assessment parameters that are provided to all the nodes for concurrent clear channel assessment (if clear channel assessment is selectively enabled) or node-specific sets of clear channel assessment parameters that are provided to the nodes so that each of the nodes may independently perform non-concurrent clear channel assessment (if clear channel assessment is selectively disabled).

At decision block 315, the node determines whether concurrent CCA has been enabled by the controller. For example, the controller may provide a configuration parameter that includes a value of ON to enable concurrent CCA operation and a value of OFF to disable concurrent CCA operation. The configuration parameters received at block 310 may also reflect whether concurrent CCA has been enabled or disabled. For example, the configuration parameters received at block 310 may include a common set of CCA parameters that are shared by the multiple nodes if concurrent CCA has been enabled. For another example, the configuration parameters received at block 310 may include a node-specific set of CCA parameters that are used by the node to configure CCA operation that is not concurrent with the other nodes, which may perform CCA using other node-specific sets of CCA parameters. If concurrent CCA has not been enabled by the controller, the node is configured to perform CCA with the node-specific CCA parameters at block 320. If concurrent CCA has been enabled, the method 300 flows to decision block 325.

At decision block 325, the node determines whether one or more indicators of performance of the node are below a threshold, which may indicate that concurrent CCA should be enabled to enhance frequency reuse. Some embodiments of the node compare a performance metric that indicates the throughput of the node to a first threshold. If the throughput is less than the first threshold, the node determines that the system is experiencing poor performance that may be improved by enabling concurrent CCA. Some embodiments of the node compare values of the channel congestion metric (C) to a second threshold. The node may determine that it is experiencing high levels of congestion if the value of the channel congestion metric (C) is less than the second threshold, which indicates that concurrent CCA may be necessary to reduce congestion. If the node determines that concurrent CCA should not be enabled (e.g., because performance levels are adequate or congestion is low), the method 300 flows to block 320 and the node is configured to perform CCA operations that are not concurrent with other nodes using node-specific CCA parameters. If the node determines that concurrent CCA should be enabled (e.g., because performance levels are low and congestion is high), the method flows to decision block 330.

At decision block 330, the node determines whether it is synchronized with the external timing reference used by the other nodes. If not, the node may not be synchronized with the other nodes in the network at the same subframe boundaries and consequently the node may not be able to participate in concurrent CCA operations with the other nodes. The method 300 therefore flows to block 320 and the node is configured to perform CCA with node-specific CCA parameters. If the node has acquired synchronization with the external timing reference, which indicates that the node is synchronized along subframe boundaries with the other nodes in the network, the method 300 flows to block 335 and the node is configured for concurrent CCA operation with the other nodes in the network using the common CCA parameters that are shared by the other nodes.

Figure 4:
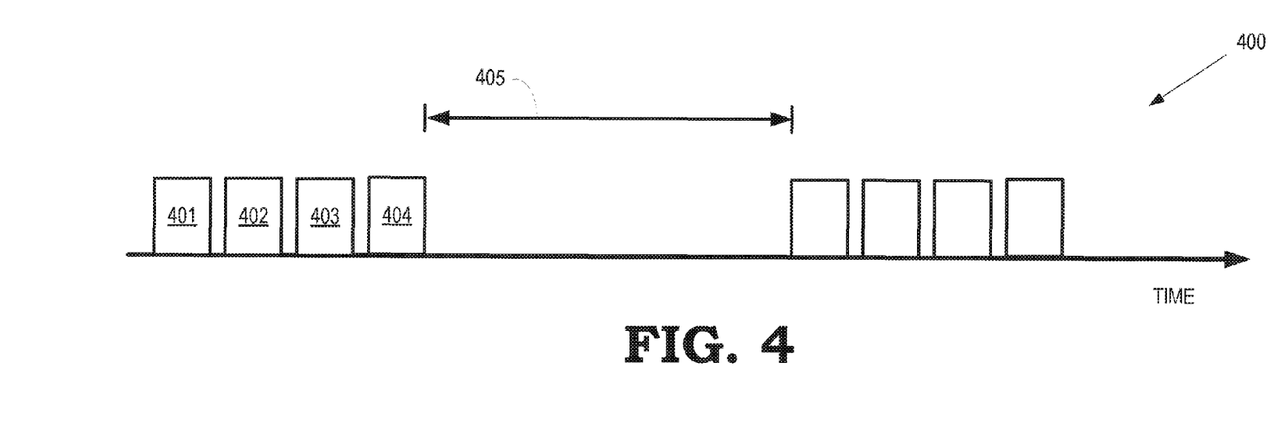
FIG. 4 is a diagram showing allocation of time intervals for performing node-specific CCA operations on a channel of an unlicensed frequency band according to some embodiments.

FIG. 4 is a diagram showing allocation 400 of time intervals for performing node-specific CCA operations on a channel of an unlicensed frequency band according to some embodiments. The horizontal axis indicates time increasing from left to right. In the illustrated embodiment, four nodes that are owned or operated by the same operator are operating in a wireless communication system and are configured for communication on the channel of the unlicensed frequency band. The nodes operate according to a first RAT (such as LTE) and may be used to implement embodiments of the small cells 115, 120 or the user equipment 140 shown in FIG. 1. The four nodes utilize four different sets of node-specific CCA parameters to perform CCA operations 401, 402, 403, 404 that are not concurrent with each other. In the illustrated embodiment, none of the nodes perform CCA operations during a time interval 405 before the next round of CCA operations begins.

Figure 5:
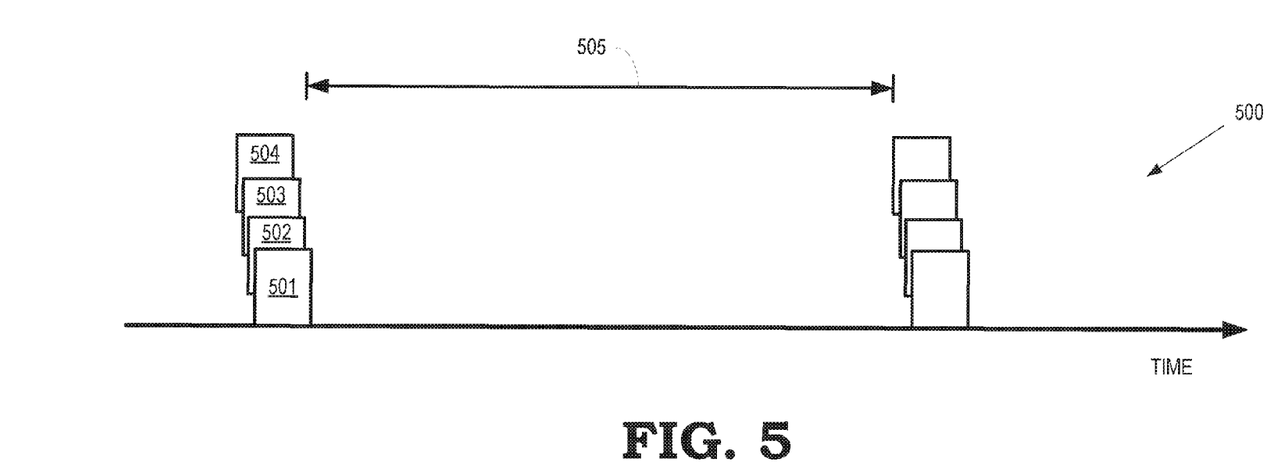
FIG. 5 is a diagram showing allocation of time intervals for performing concurrent CCA operations on a channel of an unlicensed frequency band according to some embodiments.

FIG. 5 is a diagram showing allocation 500 of time intervals for performing concurrent CCA operations on a channel of an unlicensed frequency band according to some embodiments. The horizontal axis indicates time increasing from left to right. In the illustrated embodiment, four nodes that are owned or operated by the same operator are operating in a wireless communication system and are configured for communication on the channel of the unlicensed frequency band. The nodes operate according to a first RAT (such as LTE) and may be used to implement embodiments of the small cells 115, 120 or the user equipment 140 shown in FIG. 1. The four nodes utilize the same common CCA parameters to perform CCA operations 501, 502, 503, 504 concurrently with each other. In the illustrated embodiment, none of the nodes perform CCA operations during a time interval 505 before the next round of CCA operations begins. By performing the CCA operations 501, 502, 503, 504 concurrently, the time interval 505 may be significantly longer than the time interval 405 shown in FIG. 4, which may increase the amount of time in which CCA operations do not interfere with other communications on the channel of the unlicensed frequency band.

Figure 6:
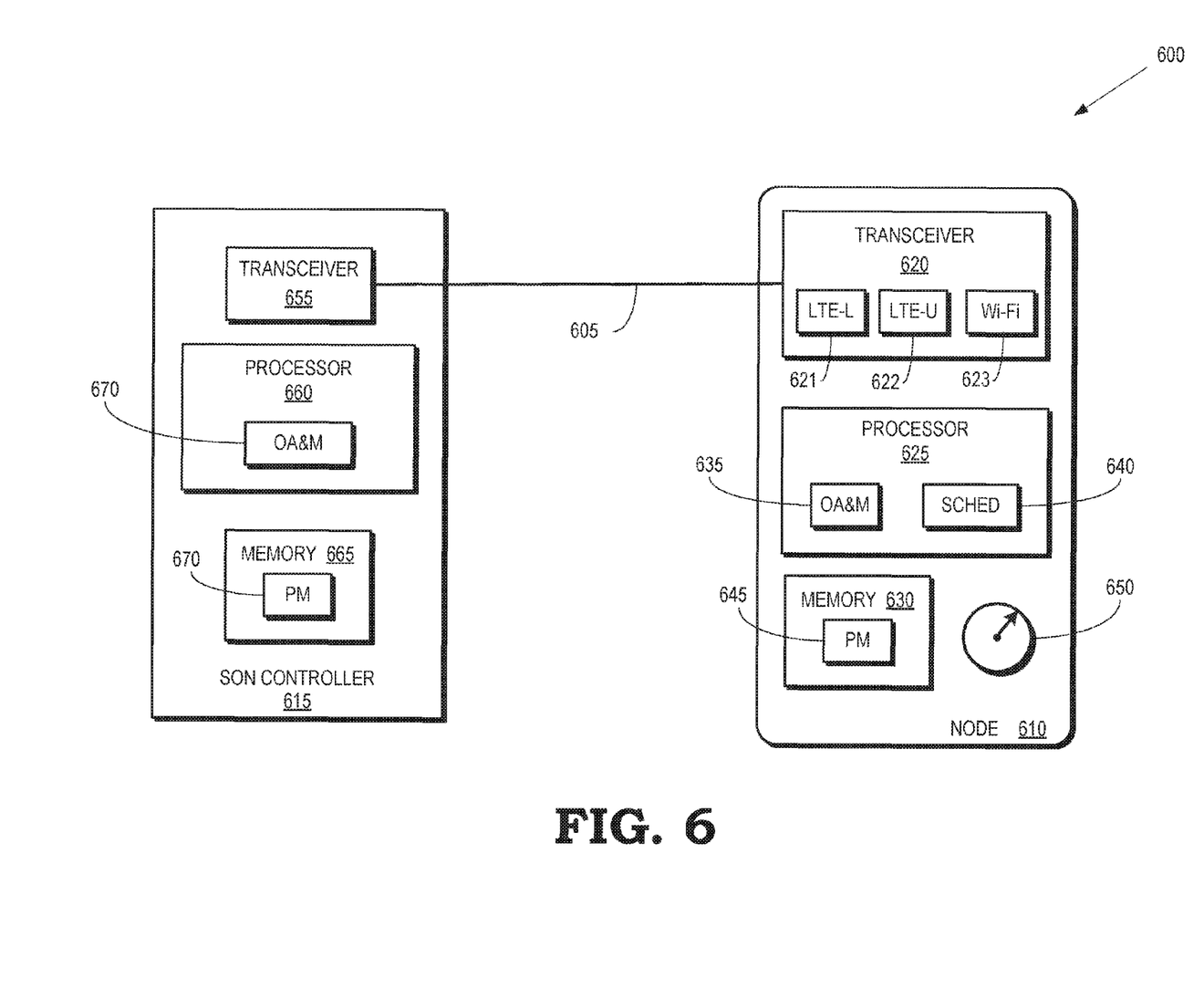
FIG. 6 is a block diagram of a wireless communication system that supports an OA&M interface between a controller and one or more nodes that support wireless communication in unlicensed frequency bands according to some embodiments.

FIG. 6 is a block diagram of a wireless communication system 600 that supports an OA&M interface 605 between a controller and one or more nodes that support wireless communication in unlicensed frequency bands according to some embodiments. The wireless communication system 600 includes a node 610 and an SON controller 615 that are connected by the interface 605. The interface 605, the node 610, and the SON controller 615 may be used to implement some embodiments of the interface 170, the small cells 115, 120, the user equipment 140, or the SON controller 165 shown in FIG. 1.

The node 610 includes a transceiver 620 for transmitting and receiving signals. Some embodiments of the transceiver 620 include an LTE-L module 621 for supporting wireless communication in licensed frequency bands according to LTE, an LTE-U module 622 for supporting wireless communication in unlicensed frequency bands according to LTE, and a Wi-Fi module 623 for supporting wireless communication in unlicensed frequency bands according to Wi-Fi. The node 610 also includes a processor 625 and a memory 630. The processor 625 may be used to execute instructions stored in the memory 630 and to store information in the memory 630 such as the results of the executed instructions. Some embodiments of the processor 625 implement an OA&M module 635 that maintains a state machine for controlling operation of the modules 622, 623, as discussed herein. Some embodiments of the processor 625 also implement a scheduler 640 that can determine one or more performance metrics, e.g., based on values of a set of PM counters 645 for storing values representative of characteristics of wireless communication in the unlicensed frequency bands. The node 610 also implements a clock or timer 650 that may be used to determine a duration of a state of the state machine, such as a flywheel state. The transceiver 620, the processor 625, and the memory 630 may therefore be configured to implement some embodiments of the state machine 200 shown in FIG. 2 or the method 300 shown in FIG. 3.

The SON controller 615 includes a transceiver 655 for transmitting and receiving signals, such as messages including configuration parameters transmitted to the transceiver 620 over the interface 605. The SON controller 615 also includes a processor 660 and a memory 665. The processor 660 may be used to execute instructions stored in the memory 665 and to store information in the memory 665 such as the results of the executed instructions. Some embodiments of the processor 660 implement an OA&M system 670 that can generate configuration parameters for the node 610. The memory 665 implements storage for PM counters 675, which may be used to store values representative of performance metrics for wireless communication in the unlicensed frequency bands that are determined based on reported values received from the node 610 or other nodes. The transceiver 655, the processor 660, and the memory 665 may therefore be used to implement some embodiments of the state machine 200 shown in FIG. 2 or the method 300 shown in FIG. 3.

At least parts of the wireless communication system 600 including the node 605 may be implemented using network functions virtualization (NFV), which is a network architecture that makes use of technologies of computer virtualization. In an NFV architecture, entities such as the node 605 or parts thereof or part of their functions can be virtualized using software building blocks that may connect, or interact, to create communication services. A virtualized network function of, e.g. the node 605, may include at least one virtual machine running different software and processes, on top of standard high-volume servers, switches and storage, or a cloud computing infrastructure, instead of having customized hardware appliances for each network function. As such functions of the node may be implemented using a computer program product embodied on a non-transitory computer readable medium for performing operations. The computer program product may include instructions, that when executed by a processor, perform the operations of the specific function of the node. A radio interface of the node 605 (such as radio interfaces supported by the transceiver 620, the LTE-L module 621, the LTE-U module 622, or the Wi-Fi module 623) may be located in one location and corresponding processing functions can be located at a remote location. The entities at the different locations may be connected via optical links or other wired or wireless communication links. Nodes that implement radio interfaces and corresponding processing functions at different locations may be referred to as distributed nodes.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
receiving, at a node in a wireless communication system, at least one configuration parameter to configure the node for communication in an unlicensed frequency band; and
transitioning, based on the at least one configuration parameter, an operating state of the node between an enable state in which the node supports wireless connectivity in the unlicensed frequency band, a disable state in which the node does not support wireless connectivity in the unlicensed frequency band, and a flywheel state in which the node supports wireless connectivity in the unlicensed frequency band for a predetermined time interval before transitioning to the disable state.

2. The method of claim 1, wherein transitioning the operating state of the node comprises transitioning the operating state of the node from the enable state to the disable state in response to receiving at least one configuration parameter that indicates communication in the unlicensed frequency band is to be disabled.

3. The method of claim 1, wherein transitioning the operating state of the node comprises transitioning the operating state of the node from the enable state to the flywheel state in response to the node losing clock synchronization with an external timing reference, and wherein transitioning the operating state of the node comprises transitioning the operating state of the node from the flywheel states to the enable state in response to acquiring clock synchronization with the external timing reference prior to expiration of a flywheel timer.

4. The method of claim 3, wherein transitioning the operating state of the node comprises transitioning the operating state of the node from the flywheel state to the disable state in response to expiration of the flywheel timer.

5. The method of claim 4, wherein transitioning the operating state of the node comprises transitioning the operating state of the node from the disable state to the enable state in response to at least one of: receiving at least one configuration parameter that indicates communication in the unlicensed frequency band is to be enabled; and acquiring synchronization with the external timing reference.

6. The method of claim 1, wherein receiving the at least one configuration parameter comprises receiving at least one configuration parameter indicating parameters for clear channel assessment by the node.

7. The method of claim 6, further comprising:
performing, at the node, clear channel assessment in the unlicensed frequency band concurrently with at least one other node using a common set of clear channel assessment parameters shared with the at least one other node, wherein the common set of clear channel assessment parameters are indicated by the at least one configuration parameter.

8. The method of claim 6, further comprising:
performing, at the node, clear channel assessment in the unlicensed frequency band using a node-specific set of clear channel assessment parameters that is not shared with at least one other node, wherein the node-specific set of clear channel assessment parameters are indicated by the at least one configuration parameter.

9. The method of claim 6, further comprising:
providing, from the node, at least one performance metric determined based on at least one performance measurement counter, wherein the at least one performance metric indicates at least one of a channel congestion metric, a channel loading metric, and a channel resource utilization metric for the unlicensed frequency bands, and wherein receiving the at least one configuration parameter comprises receiving at least one configuration parameter in response to providing the at least one performance metric.

10. A node for communication in a wireless communication system, comprising:
a transceiver to receive at least one configuration parameter to configure the node for communication in an unlicensed frequency band; and
a processor to implement a state machine that transitions, based on the at least one configuration parameter, between an enable state in which the node supports wireless connectivity in the unlicensed frequency band, a disable state in which the node does not support wireless connectivity in the unlicensed frequency band, and a flywheel state in which the node supports wireless connectivity in the unlicensed frequency band for a predetermined time interval before transitioning to the disable state.

11. The node of claim 10, wherein the state machine is configured to transition from the enable state to the disable state in response to receiving at least one configuration parameter that indicates communication in the unlicensed frequency band is to be disabled.

12. The node of claim 10, further comprising:
a flywheel timer, wherein the state machine is configured to transition from the enable state to the flywheel state in response to the node losing clock synchronization with an external timing reference, and wherein transitioning the operating state of the node comprises transitioning the state machine from the flywheel states to the enable state in response to acquiring clock synchronization with the external timing reference prior to expiration of the flywheel timer.

13. The node of claim 12, wherein the state machine is configured to transition from the flywheel state to the disable state in response to expiration of the flywheel timer.

14. The node of claim 13, wherein the state machine is configured to transition from the disable state to the enable state in response to at least one of receiving at least one configuration parameter that indicate that communication in the unlicensed frequency bands is to be enabled and acquiring synchronization with the external timing reference.

15. The node of claim 10, wherein the transceiver is configured to receive at least one configuration parameter indicating parameters for clear channel assessment by the node.

16. The node of claim 15, wherein the node is configured to perform clear channel assessment in the unlicensed frequency band concurrently with at least one other node using a common set of clear channel assessment parameters shared with the at least one other node, wherein the common set of clear channel assessment parameters are indicated by the at least one configuration parameter.

17. The node of claim 15, wherein the node is configured to perform clear channel assessment in the unlicensed frequency band using a node-specific set of clear channel assessment parameters that is not shared with at least one other node, wherein the node-specific set of clear channel assessment parameters are indicated by the at least one configuration parameter.

18. The node of claim 15, further comprising:
at least one performance measurement counter, wherein the transceiver is configured to provide at least one performance metric determined based on the at least one performance measurement counter, wherein the at least one performance metric indicates at least one of a channel congestion metric, a channel loading metric, and a channel resource utilization metric for the unlicensed frequency bands, and wherein the transceiver is configured to receive at least one configuration parameter in response to providing the at least one performance metric.

19. A non-transitory computer readable medium embodying a set of executable instructions, the set of executable instructions to manipulate a node in a wireless communication system to:
receive at least one configuration parameter to configure the node for communication in an unlicensed frequency band; and
transition, based on the at least one configuration parameter, an operating state of the node between an enable state in which the node supports wireless connectivity in the unlicensed frequency band, a disable state in which the node does not support wireless connectivity in the unlicensed frequency band, and a flywheel state in which the node supports wireless connectivity in the unlicensed frequency band for a predetermined time interval before transitioning to the disable state.

20. The non-transitory computer readable medium set forth in claim 19, wherein the node is to:
perform clear channel assessment in the unlicensed frequency band concurrently with at least one other node using a common set of clear channel assessment parameters shared with the at least one other node, wherein the common set of clear channel assessment parameters are indicated by the at least one configuration parameter.

* * * * *